US006746113B1

(12) United States Patent
Leighton et al.

(10) Patent No.: US 6,746,113 B1
(45) Date of Patent: Jun. 8, 2004

(54) SOLID PHASE CHANGE INK PRE-MELTER ASSEMBLY AND A PHASE CHANGE INK IMAGE PRODUCING MACHINE HAVING SAME

(75) Inventors: Roger Leighton, Rochester, NY (US); Scott J. Phillips, W. Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 45 days.

(21) Appl. No.: 10/320,853

(22) Filed: Dec. 16, 2002

(51) Int. Cl.[7] .................... B41J 2/175; B41J 2/17; G01D 11/00

(52) U.S. Cl. .................... 347/88; 347/85; 347/99; 347/84; 347/95; 347/86

(58) Field of Search .................... 347/88, 85, 99, 347/84, 95, 86

(56) References Cited

U.S. PATENT DOCUMENTS

| | | | | | |
|---|---|---|---|---|---|
| 4,607,266 | A | * | 8/1986 | DeBonte | 347/88 |
| 4,631,557 | A | * | 12/1986 | Cooke et al. | 347/88 |
| 4,636,803 | A | | 1/1987 | Mikalsen | 347/88 |
| 4,684,956 | A | * | 8/1987 | Ball | 347/88 |
| 4,739,339 | A | * | 4/1988 | DeYoung et al. | 347/86 |
| 4,870,430 | A | * | 9/1989 | Daggett et al. | 347/88 |
| 4,873,539 | A | * | 10/1989 | DeYoung | 347/88 |
| 5,038,157 | A | | 8/1991 | Howard | 347/88 |
| 5,372,852 | A | | 12/1994 | Titterington et al. | 427/288 |
| 5,621,444 | A | * | 4/1997 | Beeson | 347/88 |
| 6,053,608 | A | | 4/2000 | Ishii et al. | 347/88 |
| D453,787 | S | | 2/2002 | Mattern | D18/56 |
| 6,422,694 | B1 | * | 7/2002 | Hollands | 347/88 |

FOREIGN PATENT DOCUMENTS

| | | | | | |
|---|---|---|---|---|---|
| JP | 63028653 | A | * | 2/1988 | B41J/3/04 |
| JP | 01275146 | A | * | 11/1989 | B41J/3/04 |
| JP | 06143603 | A | * | 5/1994 | B41J/2/175 |

* cited by examiner

*Primary Examiner*—Lamson Nguyen
*Assistant Examiner*—Leonard Liang
(74) *Attorney, Agent, or Firm*—Tallam I Nguti

(57) ABSTRACT

A pre-melter assembly is provided for containing, conditioning and feeding solid pieces of phase change ink into a melter housing in a phase change ink image producing machine. The pre-melter assembly includes (a) a first portion having a first feeding apparatus and a first container for containing and feeding solid pieces of phase change ink. It also includes a second portion having a second container and a second feeding apparatus for containing and feeding solid pieces of phase change ink to a melter housing. The pre-melter assembly then includes a cooling device mounted in heat exchange relationship with the second feeding apparatus for maintaining a temperature Tw of the solid pieces of phase change ink below a melting point temperature Tm of the solid pieces of phase change ink, thereby preventing premature melting of the solid pieces of phase change ink before the solid pieces reach the melter housing.

20 Claims, 3 Drawing Sheets

SOLID PHASE CHANGE INK PRE-MELTER ASSEMBLY AND A PHASE CHANGE INK IMAGE PRODUCING MACHINE HAVING SAME

RELATED CASE

This application is related to U.S. application Ser. No. 10/320,854 entitled "HIGH SHEAR BALL CHECK VALVE DEVICE AND A LIQUID INK IMAGE PRODUCING MACHINE USING SAME"; and U.S. application Ser. No. 10/320.819 entitled "SOLID PHASE CHANGE INK MELTER ASSEMBLY AND PHASE CHANGE INK IMAGE PRODUCING MACHINE HAVING SAME"; and U.S. application Ser. No. 10/320,820 entitled "PHASE CHANGE INK MELTING AND CONTROL APPARATUS AND METHOD AND A PHASE CHANGE INK IMAGE PRODUCING MACHINE HAVING SAME", each of which is being filed herewith on the same day and having at least one common inventor.

BACKGROUND OF THE INVENTION

This invention relates generally to image producing machines, and more particularly to a solid phase change ink pre-melter assembly and a phase change ink image producing machine or printer having same.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the phase change ink so as to melt it and form a molten liquid phase change ink. It also includes applying droplets of the phase change ink in a liquid form onto an imaging surface in a pattern using a device such as an ink jet printhead. The process then includes solidifying the phase change ink droplets on the imaging surface, transferring them the image receiving substrate, and fixing the phase change ink to the substrate.

Conventionally, the solid form of the phase change is a "stick", "block", "bar" or "pellet" as disclosed for example in U.S. Pat. No. 4,636,803 (rectangular block, cylindrical block); U.S. Pat. No. 4,739,339 (cylindrical block); U.S. Pat. No. 5,038,157 (hexagonal bar); U.S. Pat. No. 6,053,608 (tapered lock with a stepped configuration). Further examples of such solid forms are also disclosed in design patents such as U.S. Pat. No. D453,787 issued Feb. 19, 2002. In use, each such block form "stick", "block", "bar" or "pellet" is fed into a heated melting device that melts or phase changes the "stick", "block", "bar" or "pellet" directly into a print head reservoir for printing as described above.

Conventionally, phase change ink image producing machines or printers, particularly color image producing such machines or printers, are considered to be low throughput, typically producing at a rate of less than 30 prints per minute (PPM). The throughput rate (PPM) of each phase change ink image producing machine or printer employing solid phase change inks in such "stick", "block", "bar" or "pellet" forms is directly dependent on how quickly such a "stick", "block", "bar" or "pellet" form can be melted down into a liquid. The quality of the images produced depends on such a melting rate, and on the types and functions of other subsystems employed to treat and control the phase change ink as solid and liquid, the imaging member and its surface, the printheads, and the image receiving substrates.

There is therefore a need for a relatively high-speed (greater than "XX" PPM) phase change ink image producing machine or printer that is also capable of producing relatively high quality images, particularly color images on plain paper substrates.

SUMMARY OF THE INVENTION

In accordance with the present invention, there is provided a pre-melter assembly for containing, conditioning and feeding solid pieces of phase change ink into a melter housing in a phase change ink image producing machine. The pre-melter assembly includes (a) a first portion having a first feeding apparatus and a first container for containing and feeding solid pieces of phase change ink. It also includes a second portion having a second container and a second feeding apparatus for containing and feeding solid pieces of phase change ink to a melter housing. The pre-melter assembly then includes a cooling device mounted in heat exchange relationship with the second feeding apparatus for maintaining a temperature Tw of the solid pieces of phase change ink below a melting point temperature Tm of the solid pieces of phase change ink, thereby preventing premature melting of the solid pieces of phase change ink before the solid pieces reach the melter housing.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
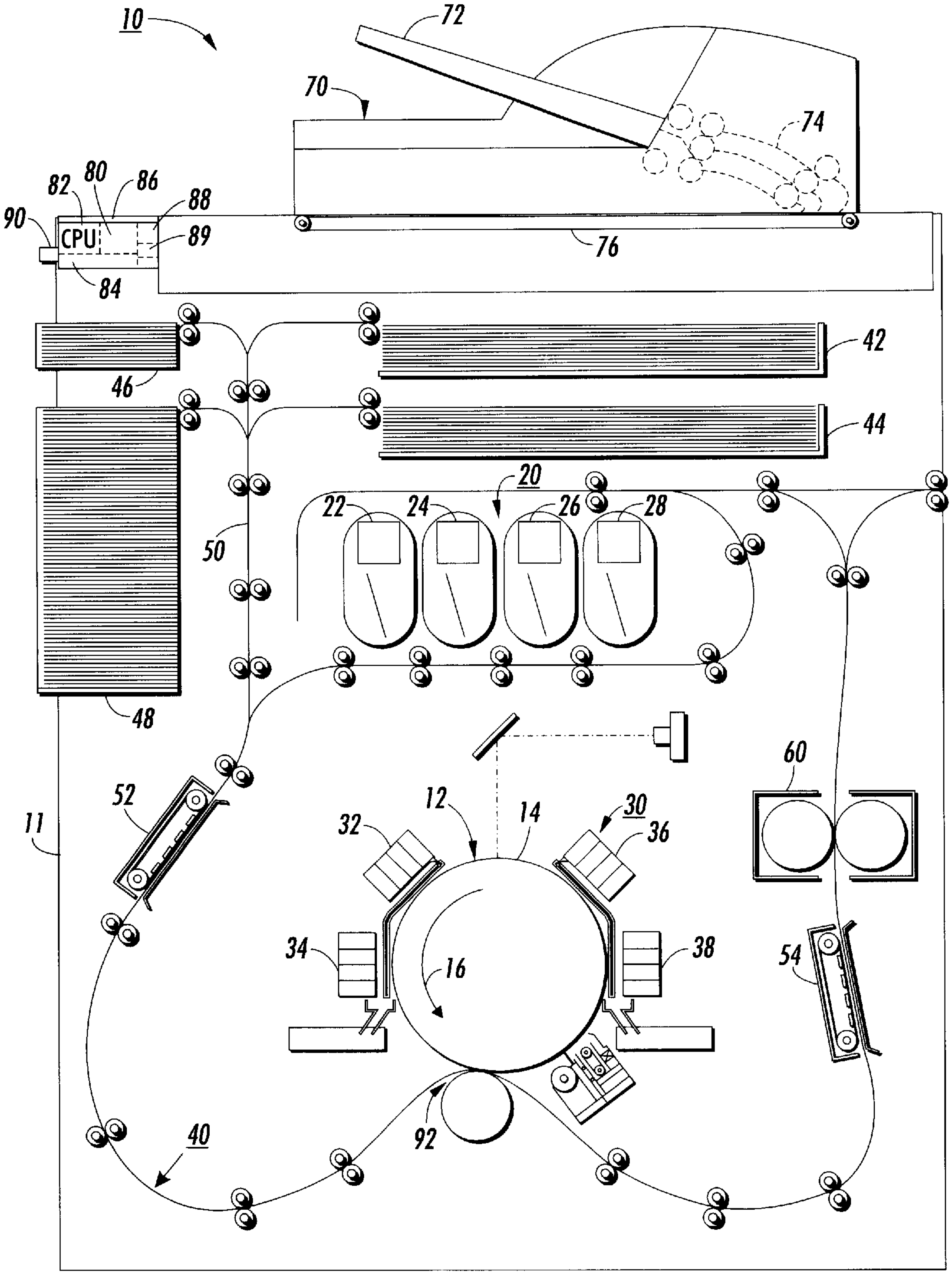
FIG. 1 is a vertical schematic of the high-speed phase change ink image producing machine or printer including the solid phase change ink pre-melter assembly of the present invention.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink system 20 that has at least one source 22 of one color phase change ink in solid form. Since the phase change ink image producing machine or printer 10 is a multicolor image producing machine, the ink system 20 includes for example four (4) sources 22, 24, 26, 28, representing four (4) different colors CYMK (cyan, yellow, magenta, black) of phase change inks. The phase change ink system 20 also includes a phase change ink melting and control assembly 100 (FIG. 2), for melting or phase changing the solid form of the phase change ink into a liquid form. Thereafter, the phase change ink melting and control assembly 100 then controls and supplies the molten liquid form of the ink towards a printhead system 30 including at least one printhead assembly 32. Since the phase change ink image producing machine or printer 10 is a high-speed, or high throughput, multicolor image producing machine, the printhead system includes for example four (4) separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Figure 2:
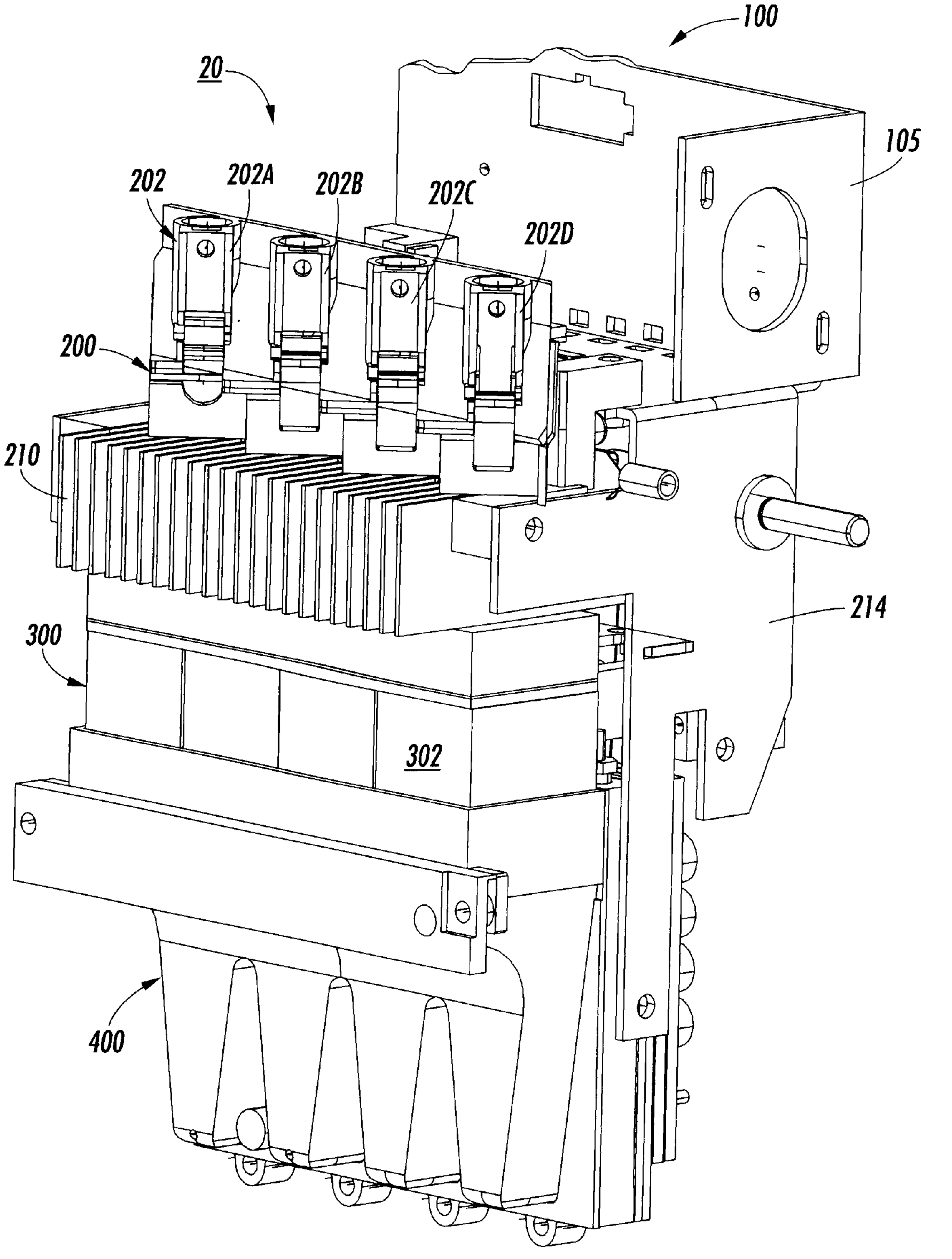
FIG. 2 is a perspective view of a melting and control system including the solid phase change ink pre-melter assembly of the present invention.
Figure 3:
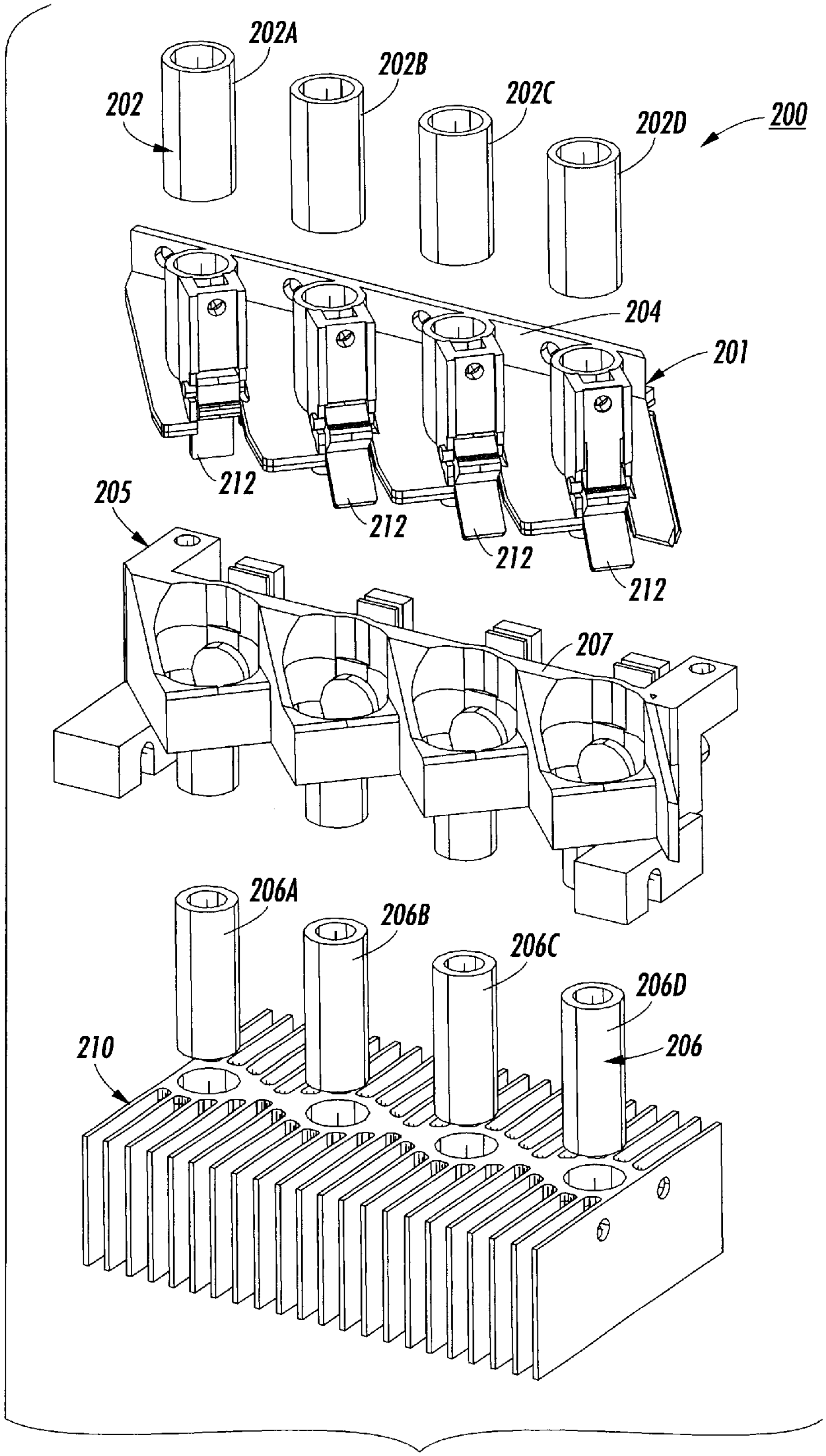
FIG. 3 is an exploded view of the components of the solid phase change ink pre-melter assembly in accordance with the present invention.

Referring now to FIGS. 2–3, a phase change ink melting and control assembly 100 that is connected to the ink system 20 is illustrated. As shown, the phase change ink melting and control assembly 100 includes a melter assembly 300 for melting or phase changing solid pieces of phase change ink to form molten liquid ink. It also includes a molten liquid ink storage and supply assembly 400 that is located below a melter housing 302 of the melter assembly 300. The phase change ink melting and control assembly 100 then includes the pre-melter assembly 200 of the present invention for controllably containing, conditioning and feeding solid pieces of phase change ink from the solid ink sources 22, 24, 26, 28 of the ink system 20.

As further illustrated, the pre-melter assembly 200 includes (a) a first portion 201 having a first feeding apparatus 202 and a first container 204 for containing and feeding solid pieces of phase change ink. It also includes a second portion 205 having a second container 207 and a second feeding apparatus 206 for containing and feeding solid pieces of phase change ink to the melter housing 302. The pre-melter assembly 200 then includes a cooling device 210 mounted in heat exchange relationship with the second feeding apparatus 206 for maintaining a temperature Tw of the solid pieces of phase change ink below a melting point temperature Tm of the solid pieces of phase change ink, thereby preventing premature melting of the solid pieces of phase change ink before the solid pieces reach the melter housing 302.

The first feeding apparatus 202 comprises 4 tubes 202A, 202B, 202C, 202D, one for each color CYMK of ink, and similarly the second feeding apparatus 206 comprises 4 thermally conductive pipes 206A, 206B, 206C, 206D, one for each color CYMK of ink. The cooling device 210 is a heat sink or heat exchanger. Each of the 4 thermally conductive pipes 206A, 206B, 206C, 206D is made for example of aluminum. The heat sink or heat exchanger 210 ensures that the solid ink pieces of phase change ink do not prematurely melt in the second feeding apparatus 206, by keeping the surface temperature Tw of the solid ink pieces at about 60° C. for example, which is below their melting temperature Tm of 110° C. The melter assembly 300, as well as the molten liquid ink storage and control assembly 400, which are all located below the pre-melter assembly 200, generate and convect heat vertically at 120° C. for example, and directly up to the aluminum thermal pipes 206A, 206B, 206C, 206D. The heat exchanger 210 is therefore very necessary.

The first container 204 is a stationary basket that is mounted to a portion of the frame 105 of the machine 10. At the bottom of the stationary or upper basket 204, there is a flapper door 212 that closes or shuts the first feeding apparatus 202 when a drawer 214 containing the rest of the ink storage and control assembly 100 is pulled out and separated from the first portion 201. This flapper door 212 prevents the solid ink pieces from falling out into the bottom of the machine. The flapper door 212 opens again when the drawer 214 is pushed back into place. The stationary upper basket 204 mounts to the frame 105 and stays behind as the drawer 214 is opened. The lower container or basket 207 is mounted in the drawer 214 with the rest of the phase change ink melting and control assembly 100.

The heat sink 210 has a perimeter of about 100 inches of fin length and about 100 square inches of fin area for providing enough cooling (about 65° C. delta T) to keep the solid ink pieces from pre-melting in the feed hole or pipes 206A, 206B, 206C, 206D prior to reaching the melter housing 302. This is important because any surfaces that are hotter than 70° C. and contact the solid ink pieces will cause the solid ink pieces to start to melt and thus create a blockage across the hole or pipes 206A, 206B, 206C, 206D. The heat sink 210 is thus designed to keep such contact surfaces below 60° C. The heat convection from the subassemblies below itself produces a temperature of 115° C. at steady state. The thermal impedance of the heat sink 210 is 1.28 C/watt.

As can be seen, there has been provided a pre-melter assembly for containing, conditioning and feeding solid pieces of phase change ink into a melter housing in a phase change ink image producing machine. The pre-melter assembly includes (a) a first portion having a first feeding apparatus and a first container for containing and feeding solid pieces of phase change ink. It also includes a second portion having a second container and a second feeding apparatus for containing and feeding solid pieces of phase change ink to a melter housing. The pre-melter assembly then includes a cooling device mounted in heat exchange relationship with the second feeding apparatus for maintaining a temperature Tw of the solid pieces of phase change ink below a melting point temperature Tm of the solid pieces of phase change ink, thereby preventing premature melting of the solid pieces of phase change ink before the solid pieces reach the melter housing.

While the embodiment of the present invention disclosed herein is preferred, it will be appreciated from this teaching that various alternative, modifications, variations or improvements therein may be made by those skilled in the art, which are intended to be encompassed by the following claims.

What is claimed is:

1. A pre-melter assembly for containing, conditioning and feeding solid pieces of phase change ink into a melter housing in a phase change ink image producing machine, the pre-melter assembly comprising:

(a) a first portion including receiving means and first containing means for receiving and containing solid pieces of phase change ink;

(b) a second portion including second containing means and feeding means for containing and feeding solid pieces of phase change ink to a melter housing; and (c) a cooling device mounted in heat exchange relationship with said feeding means of said second portion for maintaining a temperature Tw of said solid pieces of phase change ink below a melting point temperature Tm therefor to prevent premature melting thereof before said solid pieces of phase change ink reach the melter housing.

2. The pre-melter assembly of claim 1, wherein said first portion comprises a stationary first basket, and plural feeding tubes located within and through said stationary first basket for containing and feeding said solid pieces of phase change ink to the melter housing.

3. The pre-melter assembly of claim 2, wherein each feeding tube of said plural feeding tubes includes a flapper door for closing and shutting off flow of said solid pieces of phase change ink from said first portion to said second portion.

4. The pre-melter assembly of claim 3, wherein said flapper or automatically closes when said second portion is moved out of alignment relative to said first portion for preventing spilling of solid pieces of phase change ink from said first portion, and automatically opens when said second portion is moved into alignment relative to said first portion.

5. The pre-melter assembly of claim 1, wherein said second portion is movable relative to said first portion.

6. The pre-melter assembly of claim 1, wherein said second portion comprises a movable second basket and plural thermally conductive feeding pipes mounted within and through said movable second basket for containing and feeding said solid pieces of phase change ink to the melter housing.

7. The pre-melter assembly of claim 6, wherein said thermally conductive feeding pipes comprise aluminum pipes.

8. The pre-melter assembly of claim 6, wherein said second portion is mounted inside a movable drawer.

9. The pre-melter assembly of claim 1, wherein said cooling device comprises a heat sink, and said melting point temperature Tm is 110° C.

10. The pre-melter assembly of claim 1, said stationary first basket is mounted to a portion of a frame of the phase change ink image producing machine.

11. A phase change ink image producing machine comprising:

(a) a control subsystem for controlling operation of all subsystems and components of the image producing machine;

(b) a movable imaging member having an imaging surface;

(c) a printhead system connected to said control subsystem for pixel-wise ejecting drops of melted liquid phase change ink onto said imaging surface to form an image; and (d) a pre-melter assembly for containing, conditioning and feeding solid pieces of phase change ink into a melter housing in a phase change ink image producing machine, the pre-melter assembly including:

(i) a first portion including receiving means and first containing means for receiving and containing solid pieces of phase change ink;

(ii) a second portion including second containing means and feeding means for containing and feeding solid pieces of phase change ink to a melter housing; and (iii) a cooling device mounted in heat exchange relationship with said feeding means of said second portion for maintaining a temperature Tw of said solid pieces of phase change ink below a melting point temperature Tm therefor to prevent premature melting thereof before they reach the melter housing.

12. The phase change ink image producing machine of claim 11, wherein said first portion comprises a stationary first basket mounted to a frame of the image producing machine, and plural feeding tubes located within said stationary first basket for containing and feeding said solid pieces of phase change ink to the melter housing.

13. The pre-melter assembly of claim 12, wherein each feeding tube of said plural feeding tubes includes a flapper door for closing and shutting off flow of said solid pieces of phase change ink from said first portion to said second portion.

14. The phase change ink image producing machine of claim 13, wherein said flapper door automatically closes when said second portion is moved out of alignment relative to said first portion for preventing spilling of solid pieces of phase change ink from said first portion, and automatically opens when said second portion is moved into alignment relative to said first portion.

15. The phase change ink image producing machine of claim 11, wherein said second portion is movable relative to said first portion.

16. The phase change ink image producing machine of claim 11, wherein said second portion comprises a movable second basket and plural thermally conductive feeding pipes mounted within and through said movable second basket for containing and feeding said solid pieces of phase change ink to the melter housing.

17. The phase change ink image producing machine of claim 16, wherein said thermally conductive feeding pipes comprise aluminum pipes.

18. The phase change ink image producing machine of claim 16, wherein said second portion is mounted inside a movable drawer.

19. The phase change ink image producing machine of claim 11, herein said cooling device comprises a heat sink, and said melting point temperature Tm is 110° C.

20. The phase change ink image producing machine of claim 11, including a heat retaining frame mounted peripherally within said melter housing for keeping solid pieces of phase change ink away from inside walls of said melter housing, and for preventing melted ink from coalescing against said inside walls of said melter housing.

* * * * *